United States Patent
Kim

(10) Patent No.: US 8,054,721 B2
(45) Date of Patent: Nov. 8, 2011

(54) METHOD AND APPARATUS FOR DETERMINING WRITING POWER FOR RECORDING DATA

(75) Inventor: Young Il Kim, Gwangmyung-si (KR)

(73) Assignee: Hitachi-LG Data Storage Korea, Inc., Seoul (KR)

(*) Notice: Subject to any disclaimer, the term of this patent is extended or adjusted under 35 U.S.C. 154(b) by 0 days.

(21) Appl. No.: 12/890,465

(22) Filed: Sep. 24, 2010

(65) Prior Publication Data
US 2011/0019517 A1    Jan. 27, 2011

Related U.S. Application Data

(62) Division of application No. 11/544,922, filed on Oct. 10, 2006, now Pat. No. 7,839,738.

(30) Foreign Application Priority Data

Oct. 11, 2005   (KR) .................. 10-2005-0095287

(51) Int. Cl.
*G11B 7/00* (2006.01)
(52) U.S. Cl. .................. 369/47.53; 369/47.32
(58) Field of Classification Search ............... 369/47.53
See application file for complete search history.

(56) References Cited

U.S. PATENT DOCUMENTS

| | | | |
|---|---|---|---|
| 6,052,347 | A | 4/2000 | Miyata |
| 7,035,172 | B1 | 4/2006 | Murata |
| 7,035,184 | B2 | 4/2006 | Takeda |
| 7,245,571 | B2 | 7/2007 | Shimizu et al. |
| 7,277,369 | B2 | 10/2007 | Murata et al. |
| 7,436,742 | B2 | 10/2008 | Yanagawa |
| 7,436,743 | B2 | 10/2008 | Kubo et al. |
| 2004/0196762 | A1 | 10/2004 | Osakabe |
| 2005/0030861 | A1 | 2/2005 | Matsui et al. |
| 2005/0068869 | A1 | 3/2005 | Sugiyama et al. |
| 2010/0020653 | A1 | 1/2010 | Kobayashi et al. |

*Primary Examiner* — Van Chow
(74) *Attorney, Agent, or Firm* — Birch, Stewart, Kolasch & Birch, LLP

(57) ABSTRACT

A method and apparatus for determining an optimal writing power for recording data on a recording medium such as an optical disk, are discussed. The method according to an aspect of the present invention includes (a) performing a plurality of OPC operations on a plurality of areas of the recording medium, the plurality of OPC operations being performed in mutually different manners, the plurality of areas being areas within a power calibration area (PCA) allocated in the recording medium; and (b) determining an optimal writing power for recording data on the recording medium based on writing powers detected via the plurality of OPC operations.

18 Claims, 4 Drawing Sheets

FIG. 1 *Related Art*

METHOD AND APPARATUS FOR DETERMINING WRITING POWER FOR RECORDING DATA

CROSS REFERENCE TO RELATED APPLICATIONS

This application is a divisional of U.S. application Ser. No. 11/544,922 filed Oct. 10, 2006 now U.S. Pat. No. 7,839,738, which claims priority to the Korean Patent Application No. 10-2005-0095287, filed in Korea on Oct. 11, 2005. The entire contents of each of these applications are hereby incorporated by reference.

BACKGROUND OF THE INVENTION

1. Field of the Invention

The present invention relates to a method and apparatus for determining optical writing power for recording data on a recording medium such as an optical disk.

2. Description of the Related Art

FIG. 1 shows areas allocated in a CD-RW disk with emphasis on the PCA (power calibration area) used for determining optical writing power. A general optical disk recording apparatus performs an OPC (optimal power calibration) operation on the PCA of an optical disk to determine a writing power optimal for the optical disk recording apparatus and the optical disk before actually recording data in the program area of the optical disk.

As shown in FIG. 1, the OPC operation records test data of a predetermined length in the test area of the PCA several times with varying writing powers and reproduces the recorded test data to determine the writing power which results in the best-quality signals when the test data is reproduced, thereby determining the optimal writing power. The test area in the PCA is organized into 100 partitions, each of which can accommodate 15 ATIP frames. Each OPC operation records 15 frames in one of the 100 partitions. The 15 frames are recorded with 15 different writing powers.

Because the PCA is organized into 100 partitions, the optical disk can allow up to 100 new OPC operations. In other words, the first 100 OPC operations are performed in partitions wherein no data has been recorded before.

After each test recording is completed, null data of a size of one frame is written in the count area of the PCA to indicate that 1 OPC operation is conducted.

If the optimal writing power is determined after the OPC operation, data (i.e., not the test data) is recorded in the program area (data area) of the optical disk with the determined optimal writing power afterwards.

It is common that a rewritable optical disk is used in such a way that data recorded in the data area of the optical disk can be overwritten with new data if the old data is not necessary. According to this practice, when the old data recorded in a particular area of the data area is overwritten with the new data, the old data is DC erased first before the new data is recorded in the same data area. But, the quality of the recording layer of the rewritable disk is deteriorated with the repeated DC erasing and data recording operations. Therefore, the property of the rewritable optical disk at the moment of a first data recording in a data area is different from that at the moment of the overwrite in the data area. As a result, it is desirable that the writing power for overwriting the old data be different from the writing power determined at the initial data recording even for the same location of the optical disk.

According to the related art, however, when overwriting of data is performed in a data area of an optical disc, the OPC operation for determining an optimal writing power in that data area is performed in the test area of the PCA wherein no test data has been recorded before, if the number of data recording operations conducted thus far is less than 100. Thus the writing power determined in such a way leads to the deterioration of recording quality because the determined writing power is not suitable for data areas wherein DC erasing operations have been performed repeatedly.

SUMMARY OF THE INVENTION

In view of the above and other problems associated with the related art, it is an object of the present invention to provide a method and apparatus for determining an optimal writing power for recording data on a recording medium in consideration of the deterioration of the quality of the recording medium caused by repeated data recording and data erasing operations.

Another object of the present invention is to provide a recording medium, method and apparatus for determining an optimal writing power, which address the limitations and disadvantages associated with the related art.

A method for determining an optimal writing power in accordance with one embodiment of the invention detects a first writing power by performing an OPC operation for a first area of a recording medium, detects a second writing power by performing an OPC operation for a second area of the recording medium after erasing data in the second area and, and determines the writing power for recording data based on the detected first and second writing powers.

In one embodiment of the invention, the power calibration area (PCA) of the recording medium is divided into two sub-areas of the same size and an OPC operation is performed in an arbitrary section of one of the sub-areas after a DC erasing operation.

In one embodiment of the invention, if a request for writing data is the request for a data overwrite, the second writing power is detected and used for determining the wring power for recording data.

In one embodiment of the invention, the average of the first writing power and the second writing power is used as the writing power.

According an aspect of the present invention, there is provided a method for determining an optical writing power for recording data on a recording medium, the method comprising: (a) performing an optimal power calibration (OPC) operation on a first area of the recording medium, and detecting a first writing power based on the OPC operation performed on the first area; (b) performing an OPC operation on a second area of the recording medium after erasing data on the second area, and detecting a second writing power based on the OPC operation performed on the second area; and (c) determining an optimal writing power for recording data on the recording medium based on the detected first and second writing powers.

According another aspect of the present invention, there is provided a method for recording data on a recording medium, the method comprising: (a) moving to an always-overwrite optimal power calibration (AOPC) area within a test area allocated in the recording medium; (b) DC-erasing the AOPC area; (c) detecting a writing power by performing an OPC operation on the DC-erased AOPC area, and determining an optimal writing power for recording data based on at least the detected writing power; and (d) writing data in a data area of the recording medium using the determined optimal writing power.

According another aspect of the present invention, there is provided a method for determining an optical writing power for recording data on a recording medium, the method comprising: (a) performing a plurality of OPC operations on a plurality of areas of the recording medium, the plurality of OPC operations being performed in mutually different manners, the plurality of areas being areas within a power calibration area (PCA) allocated in the recording medium; and (b) determining an optimal writing power for recording data on the recording medium based on writing powers detected via the plurality of OPC operations.

According another aspect of the present invention, there is provided an apparatus for recording and/or reproducing data on a recording medium, comprising: a recording/reproducing unit configured to record signals on the recording medium and/or to reproduce signals from the recording medium; a servo unit configured to control position of a laser beam irradiated onto the recording medium by the recording/reproducing unit; and a controller configured to control the recording unit/reproducing unit and the servo unit to record signals in an arbitrary position on the recording medium and/or to reproduce or erase signals recorded in an arbitrary position on the recording medium, wherein the controller performs an optimal power calibration (OPC) operation on a first area of the recording medium, performs an OPC operation on a second area of the recording medium after erasing data on the second area, detects first and second writing powers respectively from the OPC operations performed on the first and second areas, and determines an optimal writing power for recording data based on the detected first and second writing powers.

According another aspect of the present invention, there is provided an apparatus for recording data on a recording medium, comprising: a reading/recording unit configured to read or record signals on the recording medium; a servo unit configured to control a position of a laser beam irradiated onto the recording medium by the reading/recording unit; and a controller configured to control the reading/recording unit and the servo unit to perform a plurality of OPC operations on a plurality of areas of the recording medium, the plurality of OPC operations being performed in mutually different manners, the plurality of particular areas being areas within a power calibration area (PCA) allocated in the recording medium, and determine an optimal writing power for recording data on the recording medium based on writing powers detected via the plurality of OPC operations.

According another aspect of the present invention, there is provided an apparatus for recording data on a recording medium, comprising: a recording unit configured to record signals on the recording medium; a servo unit configured to control a position of a laser beam irradiated onto the recording medium by the recording unit; and a controller configured to control the recording unit and the servo unit to record signals in an arbitrary position on the recording medium, wherein the controller contains division information for dividing a test area of the recording medium and performs a plurality of optimal power calibration (OPC) operations on the divided test area according to the division information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
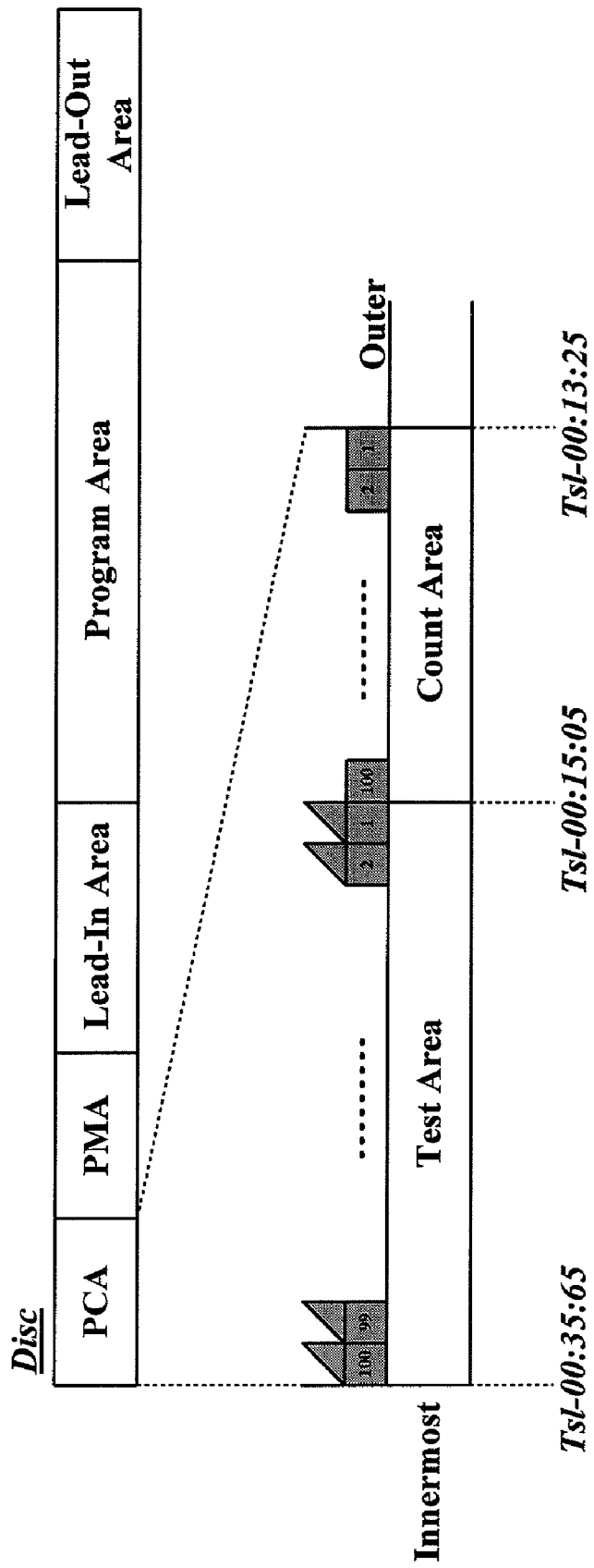
FIG. 1 illustrates areas allocated in a CD-RW disk with emphasis on the PCA (power calibration area) used for determining an optimal writing power according to a related art.
Figure 2:
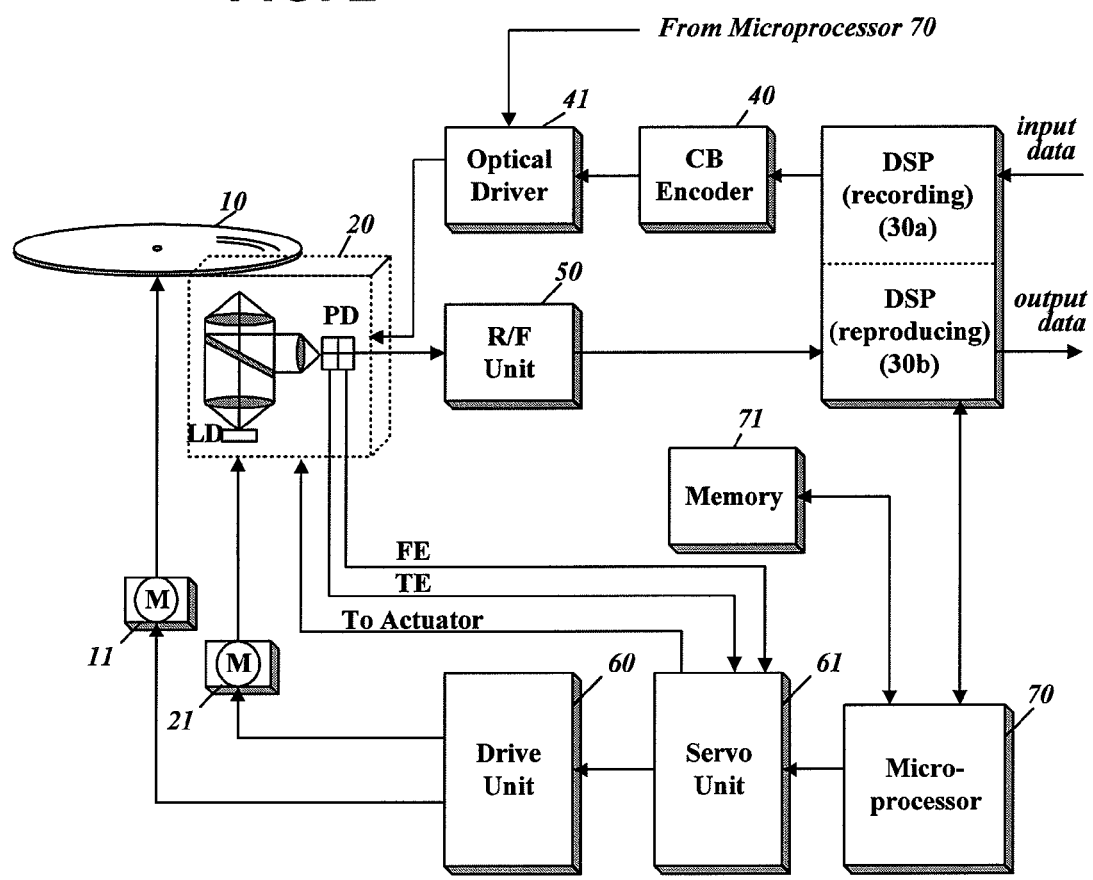
FIG. 2 illustrates a block diagram of an optical disk recording/reproducing apparatus embodying the present invention.

FIG. 2 is a block diagram of an optical disk recording/reproducing apparatus embodying the present invention.

Referring to FIG. 2, the apparatus comprises a first digital signal processor (DSP) 30a for recording, which converts input digital data into a recording format by adding ECC, etc, a channel bit encoder 40 for converting the data in the recording format from the first DSP 30a into a bit stream, an optical driver 41 for generating an optical drive signal according to the bit stream, an optical pickup 20 for recording the bit stream on an optical disk 10 by irradiating a laser beam according to the optical drive signal onto the optical disk 10 and for detecting signals recorded on the optical disk 10 from the reflected laser beam, an R/F unit 50 for generating a binary signal and focus/tracking error signals from the signals detected by the optical pickup 20, a drive unit 60 for driving a spindle motor 11 for rotating the optical disk 10 and for driving a sled motor 21 for moving the optical pickup 20, a servo unit 61 for controlling the drive unit 60 based on the focus/tracking error signals and the rotational speed of the optical disk 10, a second digital signal processor (DSP) 30b for reproduction, which retrieves original digital data from the binary signal using a clock synchronized with the binary data, a memory (e.g., EEPROM) 71 for storing values of target $\beta$, target $\gamma$, and target power associated with each of disk manufacturers (disk codes) and recording speeds, and any other information, and a microprocessor 70 for performing the OPC operation in a specified area of the optical disk 10 and for controlling all the components as needed so that requested recording operations can be performed using the detected optimal writing power. The microprocessor 70 also controls other operations of the apparatus. All the components of the apparatus are operatively coupled and configured.

Figure 3:
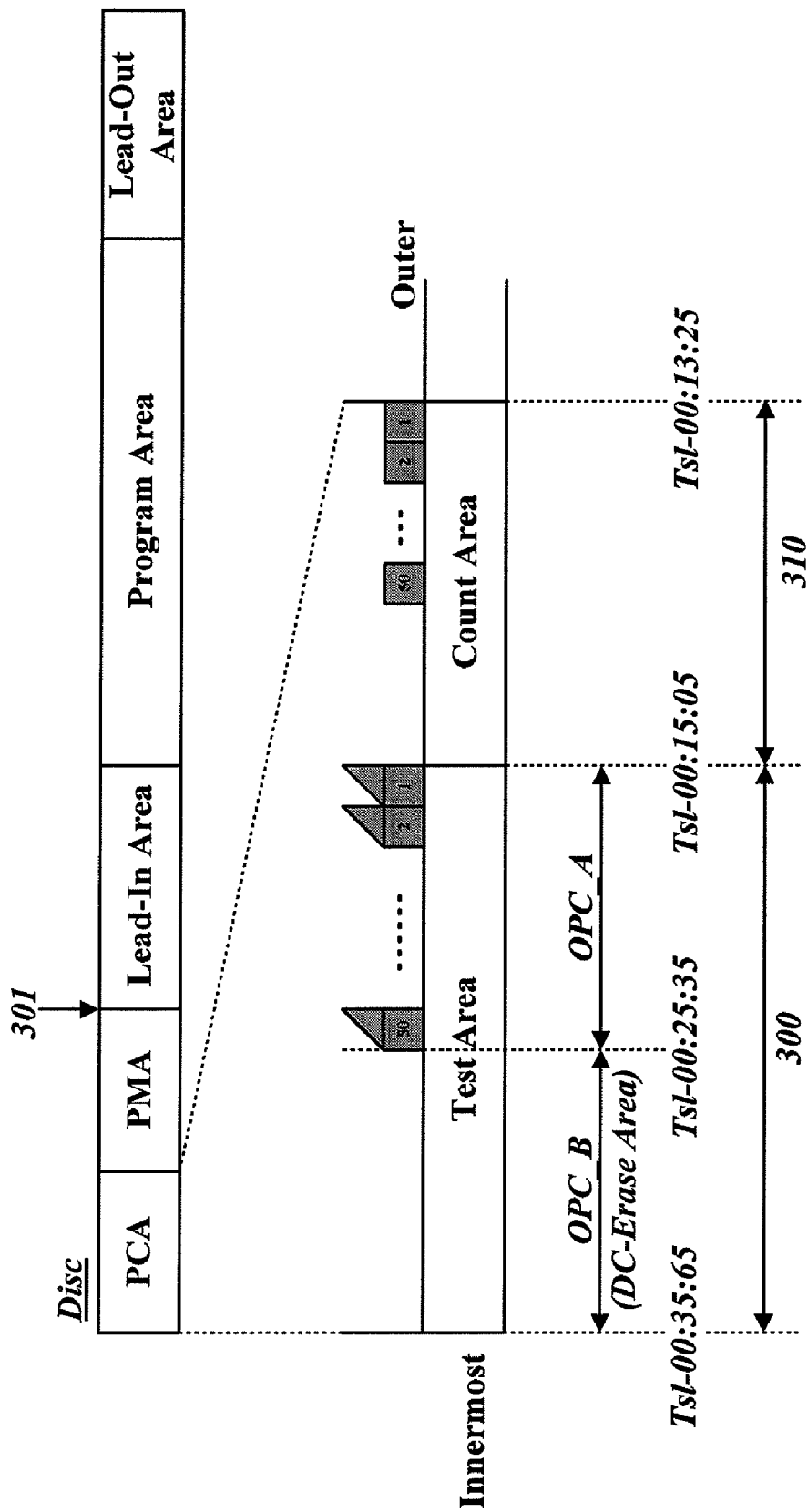
FIG. 3 illustrates an example in which the test area of the PCA is divided into two sub-areas for determining an optimal writing power in accordance with one embodiment of the invention.

FIG. 3 shows an example wherein the microprocessor 70 utilizes a test area 300 of a PCA of an optical disc 10 by dividing the test area in accordance with an embodiment of the present invention. The PCA includes the test area 300 and a count area 310. In this example, the test area 300 of the PCA of the optical disk 10 is divided into OPC_A and OPC_B areas.

In one embodiment of the invention, the test area of the PCA is divided into OPC_A area and OPC_B area of the same size. In general, the test area is from Tsl-00:15:05 to Tsl-00:35:65, wherein Tsl indicates the time information on the start position 301 of the lead-in area of the disk 10. Therefore, OPC_A area is from Tsl-00:15:05 to Tsl-00:25:35 and OPC_B area is from Tsl-00:25:35 to Tsl-00:35:65. The count area is from Tsl-00:13:25 to Tsl-00:15:05.

The microprocessor 70 of the optical disk recording apparatus in FIG. 2 recognizes the test area 300 of the optical disk 10 as two divided areas. The information on the position that divides the test area is stored in the memory 71 or hard-coded into the program which the microprocessor 70 executes. Though the test area 300 is divided into two areas of the same size in one embodiment of the invention, the test area 300 may be divided into any number of sub-areas of the same or different sizes if necessary. Such case is also considered to fall within the scope of the invention if a DC erasing is executed in one sub-area before an OPC operation is executed.

In one embodiment of the invention, each OPC operation executed in OPC_B area is always preceded by a DC erasing, whereas a conventional OPC operation is performed in OPC_A area.

The test area according to the related art can accommodate up to 100 OPC operations in areas wherein no data has been recorded before. In the present invention, however, the test area 300 is divided into OPC_A area and OPC_B area of the same size and therefore up to 50 OPC operations can be performed in unwritten partitions of OPC_A area. After the first 50 OPC operations are executed, a DC erasing is required to perform the next OPC operations in OPC_A area.

On the other hand, when an OPC operation is to be performed in OPC_B area, a DC erasing is always executed before each of the actual OPC operations is performed, so as to return the OPC_B area to the blank state. Then the actual OPC operation is performed in a partition in OPC_B area, the partition being randomly selected from 50 partitions in OPC_B area.

According to an embodiment, two separate OPC operations may be performed respectively in OPC_A and OPC_B areas. However, 1-frame null data is written in the count area 310 each time an OPC operation is performed in OPC_A area. The number of OPC operations executed in OPC_A area can be obtained based on the length of null data written in the count area 310. If the number reaches the maximum number of OPC operations which can be executed in OPC_A area (e.g., 50), OPC_A area is DC erased so that further OPC operations can be performed in OPC_A area.

Figure 4:
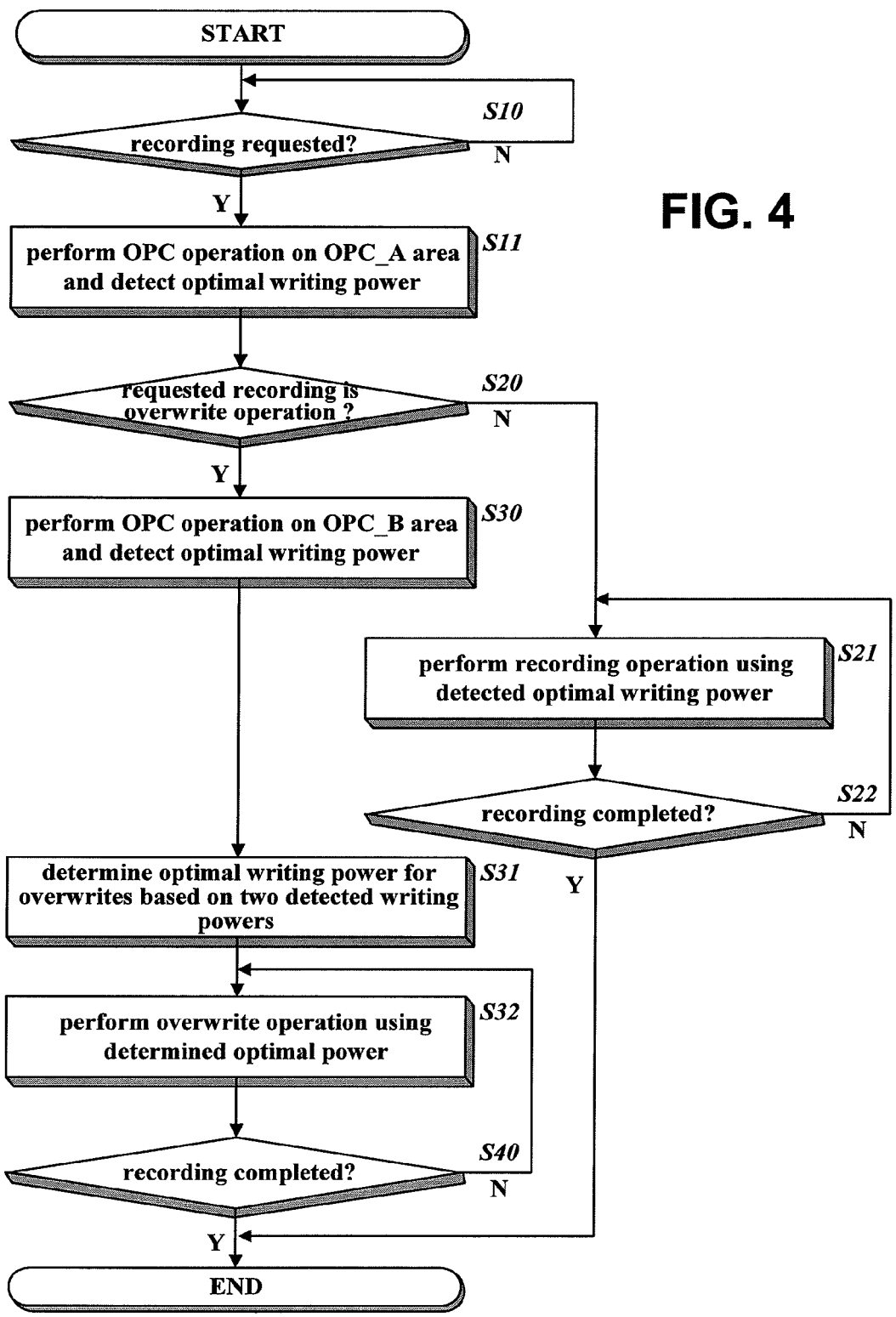
FIG. 4 illustrates a flow chart of a method for determining an optimal writing power using divided test areas for performing OPC operations in accordance with one embodiment of the invention.

FIG. 4 shows a flow chart of a method for determining an optical writing power in accordance with one embodiment of the invention, which will be described in detail with reference to FIGS. 2 and 3. This method is implemented by the apparatus of FIG. 2, but can be implemented by other suitable device/system.

Referring FIG. 4, if the optical disk 10 is loaded in the apparatus of FIG. 2, the microprocessor 70 performs predetermined basic operations such as disk type detection and servo initialization. If data recording is requested (S10), the microprocessor 70 obtains the number of OPC operations previously performed from the length of null data written in the count area 310 of the optical disk 10 to determine where to perform the next OPC operation in OPC_A area. If the obtained number of the performed OPC operations is N, the next OPC operation is performed at a location at a distance of 15×(N+1) ATIP frames inward from the start position of OPC_A (Tsl-00:15:05).

The location in which the next OPC operation will be performed may be detected in a different manner. The microprocessor 70 first moves the optical pickup 20 to the start position of OPC_A area (Tsl-00:15:05) and controls the optical pickup 20 to move inwardly, i.e., towards the inner areas of the disk 10. As the optical pickup 20 moves inward, a signal indicating whether the laser beam spot is on an unwritten area is generated by the RF unit 50. This signal is called 'RECD' wherein the state of this signal is 'L' if the current location is an unwritten area or is 'H' otherwise. Monitoring the 'RECD', the microprocessor 70 detects the position wherein the 'RECD' switches from 'H' to 'L' and performs the next OPC operation at a location which is at a distance of 15 ATIP frames inward from the detected position.

If the location in which the next OPC operation will be performed is determined, the OPC operation will be performed from the determined location as follows.

The microprocessor 70 reads the target power corresponding to the code of the optical disk 10 and OPC writing speed from the memory 71, and provides a writing power adjustment signal for changing the writing power by a predetermined step from the detected target power each time for the optical driver 41.

The optical driver 41, responsive to the writing power adjustment signal, outputs signals for writing the test data with the optical power corresponding to the writing power adjustment signal. The optical pickup 20 starts recording the signals for writing the test data, which are provided by the optical driver 41, from the determined location. As described before, one OPC operation writes 15 frames with 15 different writing powers.

After completing the recording of the test data, the microprocessor 70 controls the optical pickup 20 to reproduce the recorded test data and detects the quality of the reproduced test data. If the optical disk 10 is a one time writable disk (e.g., CD-R), the microprocessor 70 detects the $\beta$ value from the reproduced RF signal, the $\beta$ value indicating the degree of asymmetry of the reproduced RF signal. Using the $\beta$ value and the writing power Pw which yields the $\beta$ value associated with each of the 15 writing powers, the microprocessor 70 obtains a curve fit of the values ($\beta$, Pw). The microprocessor 70 determines the optimal writing power for OPC_A area based on the obtained curve fit, the code of the optical disk 10, and the target $\beta$ value stored in the memory 71 (S11).

If the optical disk 10 is a rewritable disk, the microprocessor 70 obtains the modulation index $\gamma$, which indicates the amplitude of the RF signal reproduced from the recorded test data, instead of the $\beta$ value. The microprocessor 70 detects the value of $\gamma$ associated with each writing power and determines the optimal writing power for OPC_A area based on the values of $\gamma$.

After the OPC operation in OPC_A area is completed, the microprocessor 70 writes 1-frame null data in the count area 310 of the optical disk 10 as described before.

If the OPC operation is completed at step S10, the microprocessor 70 determines whether the request for writing data (e.g., in a data area of the disk 10) is the request for an overwrite operation (S20). If not, i.e., data is to be written in an unwritten area (e.g., in an unwritten area of the data area), the microprocessor 70 performs the requested writing operation in the unwritten part of the data area (e.g., program area, etc.) of the optical disk 10 using the optimal writing power determined at step S11 (S21 and S22).

The decision on whether the writing operation on the data area of the disk is a data overwrite can be made based on the existence of recorded data at the location wherein the recording is to be done. The existence of recorded data can be examined from the information on the recording sections of each track written in the PMA. If the location wherein the recording is to be done belongs to a section of a track written in the PMA, it is determined that the requested recording operation is a data overwrite.

If it is determined at step S20 that the requested recording operation is an overwrite of data in the data area of the optical disk 10, the microprocessor 70 performs an additional OPC operation in OPC_B area after finishing the OPC operation in OPC_A area. The microprocessor 70 first DC-erases OPC_B area and moves the objective lens of the optical pickup 20 to an arbitrary position, and performs the aforementioned OPC operation to determine an optimal writing power for OPC_B area (S30). Alternatively, the microprocessor 70 selects a location in OPC_B area and performs the aforementioned OPC operation after DC-erasing of at least 1 partition in OPC_B area from the location.

The reason for performing the OPC operation in OPC_B area after DC-erasing OPC_B area in the case of a data overwrite is to make the condition under which the optimal writing power is to be determined similar to the condition under which data is to be actually written in the data area of the optical disk 10 after the DC erasing. This allows the optimal writing power determined from OPC_B area to be more suitable for the data overwriting operation in the data area.

If the two optimal writing powers are obtained by performing two OPC operations in OPC_A and OPC_B areas, respectively as discussed above, the microprocessor 70 fixes the average of the two determined optimal writing powers (from OPC_A and OPC_B areas) as the optimal writing power for the current disk. Once the optimal writing power is determined, the microprocessor 70 performs the requested data recording (e.g., data overwriting) in the data area of the optical disk 10 with the determined optimal writing power (S32). As an alternative, if a data overwriting is requested in a data area, then the optimal writing power determined only from OPC_B area after the DC-erasing, may be used as the optimal writing power for the disk in the data overwriting operation.

In the embodiment shown in FIG. 3, if the requested recording operation is a data overwrite, the average of the two writing powers obtained from OPC_A and OPC_B areas is adopted as the optimal writing power. This is because though N-1 overwrites were performed in the data area of the optical disk 10, it is quite likely that the number of overwrites operations conducted in the area in which the N-th overwrite will be done is not N-1, considering that data is not always recorded in all of the data area of the optical disk 10. But (N-1) DC erasing operations were actually executed in OPC_B area.

In other words, the number of overwrite operations conducted in the area in which a data overwrite is to be done is likely to be less than N-1. As a result, the average of the writing power detected in OPC_A area wherein a DC erasing is rarely executed (1 DC erasing is executed after 50 write operations in the previous embodiment) and the writing power detected in OPC_B area wherein a DC erasing is executed at every overwrite operation is preferably adopted as the optimal writing power.

As a variation, instead of using the average of the optimal writing powers determined from OPC_A and OPC_B area, a weighted sum obtained by adding such two products (($a1\times$ writing power from OPC_A)+($a2\times$ writing power from OPC_B)) can be used as the optimal writing power, wherein $a1$ and $a2$ are constants. Here, the sum of the constants $a1$ and $a2$ is 1, each of the constants $a1$ and $a2$ being less than 1. The constants $a1$ and $a2$ can be determined in consideration for the ratio of the average amount of data recorded by a single writing operation to the capacity of the optical disk 10. For example, if the average amount of data recorded by a single writing operation is ¼ of the disk capacity, it is expected that one DC erasure is conducted in every 4 writing operations. In this case, it is desirable to set $a1$ to 0.25 and $a2$ to 0.75. Other examples are possible.

Manufacturers of optical disks, therefore, may investigate the average amount of data recorded in each writing operation and determine the values of $a1$ and $a2$ depending on the average amount of data. The values of $a1$ and $a2$ can be stored in the memory 71 or hard-coded into the program executed by the microprocessor 70, and can be used to determine the optimal writing power.

It is also possible to let the user of the optical disk recording apparatus adjust the values of $a1$ and $a2$ for determining the optimal writing power. For example, the optical disk recording apparatus may provide a message like "The frequency of data overwrites is high, medium, or low?" to the user, e.g., on the associated screen, and determines the values of $a1$ and $a2$ depending on the user's response. If the frequency is selected to be high, the value of $a1$ can be selected to be higher than 0.5, wherein $a1+a2=1$. If the frequency is low, the value of $a1$ can be selected to be lower than 0.5, wherein $a1+a2=1$. The number of frequency intervals for determining the values of $a1$ and $a2$ can be increased for more delicate adjustment.

At least one embodiment of the method for determining an optimal writing power in accordance with the present invention can improve the quality of recorded signals by determining an optimal writing power for a data overwrite operation and performing the data overwrite operation with the determined optimal writing power. The advantages and benefits of the present invention over conventional methods become larger as the number of overwrite operations to be performed on an optical disk increases.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method for determining an optical writing power for recording data on a recording medium, the method comprising:
    performing a plurality of OPC operations on a plurality of areas of the recording medium, the plurality of OPC operations being performed in mutually different manners, wherein the plurality of OPC operations include a first OPC operation and a second OPC operation performed in mutually different manners, and the plurality of areas are areas within a power calibration area (PCA) allocated in the recording medium; and
    determining an optimal writing power for recording data on the recording medium based on a combination of a first writing power detected from the first OPC operation and a second writing power detected from the second OPC operation.

2. The method of claim 1, wherein one of the plurality of OPC operations writes test data on at least one of the plurality of areas after performing an erasure of data written on the at least one of the plurality of areas, and detects a writing power based on characteristics of signals obtained from reading the written test data.

3. The method of claim 1, wherein the plurality of areas are uniformly-divided in the PCA.

4. The method of claim 1, wherein one of the plurality of OPC operations is performed when a request for writing data on the recording medium is a data overwriting request.

5. The method of claim 1, wherein one of the plurality of OPC operations is performed on at least one of the plurality of areas, after arbitrarily selecting a predetermined section from the at least one of the plurality of areas whose data is erased.

6. The method of claim 1, further comprising:
   writing data of a predetermined length in a count area allocated in the recording medium to indicate that the number of OPC operations performed on the recording medium is incremented by 1.

7. The method of claim 1, further comprising:
   writing recording-requested data in a data area of the recording medium with the determined optimal writing power.

8. The method of claim 1, wherein in the determining step, the optimal writing power is determined by multiplying the first writing power detected from the first OPC operation by a constant a1 and multiplying the second writing power detected from the second OPC operation by a constant a2 and then adding the two products, where a1<1, a2<1, and a1+a2=1.

9. The method of claim 8, wherein each of the constants a1 and a2 equals 0.5.

10. An apparatus for recording data on a recording medium, comprising:
    a reading/recording unit configured to read or record signals on the recording medium;
    a servo unit configured to control a position of a laser beam irradiated onto the recording medium by the reading/recording unit; and
    a controller configured to control the reading/recording unit and the servo unit to perform a plurality of OPC operations on a plurality of areas of the recording medium, the plurality of OPC operations being performed in mutually different manners, wherein the plurality of OPC operations include a first OPC operation and a second OPC operation performed in mutually different manners, and the plurality of areas are areas within a power calibration area (PCA) allocated in the recording medium, and determine an optimal writing power for recording data on the recording medium based on a combination of a first writing power detected from the first OPC operation and a second writing power detected from the second OPC operation.

11. The apparatus of claim 10, wherein one of the plurality of OPC operations writes test data on at least one of the plurality of areas after performing an erasure of data written on the at least one of the plurality of areas, and detects a writing power based on characteristics of signals obtained from reading the written test data.

12. The apparatus of claim 10, wherein the plurality of areas are uniformly-divided in the PCA.

13. The apparatus of claim 10, wherein the controller performs one of the plurality of OPC operations when a request for writing data on the recording medium is a data overwriting request.

14. The apparatus of claim 10, wherein the controller performs one of the plurality of OPC operations to perform the OPC operation on at least one of the plurality of areas, after arbitrarily selecting a predetermined section from the at least one of the plurality of areas whose data is erased.

15. The apparatus of claim 10, wherein the controller writes data of a predetermined length in a count area allocated in the recording medium to indicate that the number of OPC operations performed on the recording medium is incremented by 1.

16. The apparatus of claim 10, wherein the controller writes recording-requested data in a data area of the recording medium with the determined optimal writing power.

17. The apparatus of claim 10, wherein the optimal writing power is determined by multiplying the first writing power detected from the first OPC operation by a constant a1 and multiplying the second writing power detected from the second OPC operation by a constant a2 and then adding the two products, where a1<1, a2<1, and a1+a2=1.

18. The apparatus of claim 17, wherein each of the constants a1 and a2 equals 0.5.

* * * * *